Feb. 22, 1966  E. WAWRZINICK ETAL  3,236,344
ARRANGEMENT FOR IMPROVING THE OPERATION
OF INTERNAL COMBUSTION ENGINES
Filed Feb. 9, 1961

3,236,344
ARRANGEMENT FOR IMPROVING THE OPERATION OF INTERNAL COMBUSTION ENGINES
Erwin Wawrzinick and Ernst Alt, Ingolstadt, Germany, assignors to Auto-Union G.m.b.H., Ingolstadt (Danube), Germany
Filed Feb. 9, 1961, Ser. No. 100,773
Claims priority, application Germany, Feb. 11, 1960, A 33,936
6 Claims. (Cl. 192—.084)

The present invention relates to a combustion system for internal combustion engines and more particularly to a device for improving the mixture ratio of a two cycle internal combustion engine to provide more complete combustion in the exhaust pipe.

The exhaust gases of internal combustion engines may have a poisonous effect due to the formation of carbon monoxide (CO) or may develop a bad odor and be irritating to the eyes due to the formation of aldehydes and carbon dioxides if the combustion of the fuel employed for operating the engine is not complete. In the case of a four cycle engine, these noxious substances are eliminated preferably by after-burning in a combustion chamber or in catalytically acting devices wherein the oxygen necessary for the combustion is added by a pump or other suitable means.

It is an object of the invention to provide a simple and effective arrangement for after-burning the exhaust gases of internal combustion engines. This arrangement provides means for increasing the air-fuel ratio, as well as the simultaneous application of a catalytic or after-burning device in the exhaust pipe.

In the Otto-cycle engine the air to fuel ratio is set as closely as possible to the theoretical mixture ratio of 14.5:1. In the case of the four cycle engine almost the entire fresh air goes through the combustion process because during a air change with normal valve overlapping the scavenging losses are only small. In the case of the two cycle engine the loss of fresh air is larger. This invention is directed to an arrangement which provides that large amounts of oxygen are available in the exhaust system so that a more complete after-burning is obtained.

During the catalytic after-burning of the exhaust gases, the reaction between the unburnt substances and the oxygen still available to support combustion is made possible already at lower temperatures, but the oxygen concentration in the exhaust gas is so small in the case of the four cycle engine that the catalyst is not able to work sufficiently and requires therefore an added supply of oxygen or air.

According to the invention the application of a controlled air-fuel mixture provides an effective decrease of excessive hydrocarbon particles in the exhaust gas. The invention uses the larger scavenging loss of the two cycle internal combustion engine, which is basically a disadvantage, so that the combustion of the fresh air portion in the exhaust gas increases the temperature in the catalyst to such an extent that even the smallest oxygen residues are subjected to combustion. Oxygen for the catalyst is made available according to the invention by increasing the air-fuel ratio. The proper air-fuel mixtures which is suitable for a safe operation of two cycle engines brings about, in the case of the fresh air as well as in the case of the exhaust gas over a larger operating range, an increase of hydrocarbons which barely take part in the combustion and which consume afterwards additional oxygen in the catalytic after-burner. For this purpose the amount of oil or lubricant which is added to the gasoline in the carburetor by means of a suitably controlled pump assembly is reduced during conditions of small loads and at low speeds of revolution as compared to the normally employed constant mixture ratio of oil to gasoline of 1:40.

The noxious hydrocarbon particles carried in the exhaust gases of internal combustion engines may be reduced by closing the fuel nozzle for the idle running of the engine when the motor vehicle is moving at no-load, for example, by closing a valve by means of a magnet. In the usual motor, the throttle valve is closed upon a reduction of the speed of the motor vehicle while it is moving without load. But when the engine is idling, the speeds of revolution are very low as compared to the speed of revolution of the engine when the motor vehicle is moving at a given speed without load. This correspondingly high revolution of the engine creates a considerable vacuum in the suction tube and thus causes an increased supply of the fuel mixture to flow from the idling canal. However, this increase in the fuel supply is not required for the proper operation of the vehicle and the exhaust gas is thereby laden excessively with superfluous hydrocarbons.

According to the invention, a valve is arranged in the idling canal so that the supply of hydrocarbons is interrupted during the period when the vehicle is moving without load so that the engine is able to suck in only the idling air and the air which may be admitted due to the relatively untight condition of the throttle valve. The exhaust system is thus provided with an additional supply of oxygen. During driving in traffic, for down-hill driving and under similar conditions in which the exhaust system remains relatively cold and therefore offers poor conditions for proper after-burning, the oxygen, which is introduced without hydrocarbons, due to the closing of the fuel supply, provides a good after-burning in the exhaust system.

The invention is illustrated in the accompanying drawing in which.

Figure 1:
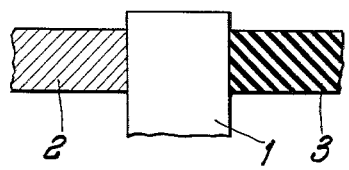
FIGURE 1 shows a schematic illustration of the oxygen content of the exhaust gases in a four cycle internal combustion engine.

Referring now to FIG. 1 of the drawing, numeral 1 designates a cylinder of a four cycle internal combustion engine into which fresh air 2 which contains about 20% oxygen is introduced. This oxygen is burned practically entirely in the cylinder so that the exhaust gases 3 contain only about 0.4 to 0.6% oxygen.

Figure 2:
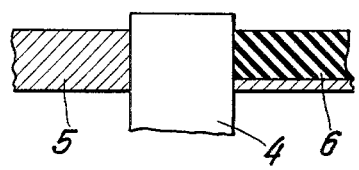
FIGURE 2 shows a schematic illustration of the oxygen content of the exhaust gases in a two cycle internal combustion engine.

Referring now to FIG. 2 of the drawings, the cylinder 4 is also supplied with fresh air 5 containing about 20% oxygen. Due to the scavenging losses however about 3.5 to 6% of the oxygen passes through the combustion stage and remains in the exhaust gases 6.

Figure 3:
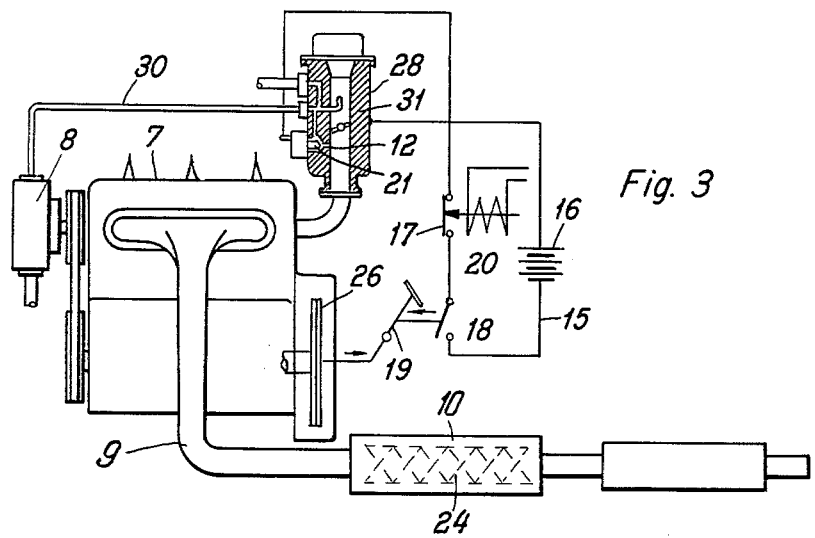
FIGURE 3 shows a two cycle internal combustion engine provided with a catalyst in the exhaust system.

According to the embodiment of the invention illustrated in FIG. 3 of the drawing, the two cycle internal combustion engine 7 drives a pump assembly 8 which may be controlled either by the load of the engine or by its number of revolutions and which feeds oil in the required amounts to the carburetor (not shown). The exhaust gases are conducted through an exhaust pipe 9 into an exhaust chamber 10 which contains a catalyst or after-burner 24. By providing an arrangement for increasing the air to fuel ratio, for instance, a controlled air-fuel mixture and also a catalyst or after-burner in the exhaust system, the high exhaust temperature produced by the high oxygen content of the exhaust gases produces an effective after-burning so that the formation of carbon monoxide, aldehydes and nitrogen oxides is considerably reduced.

Figure 4:
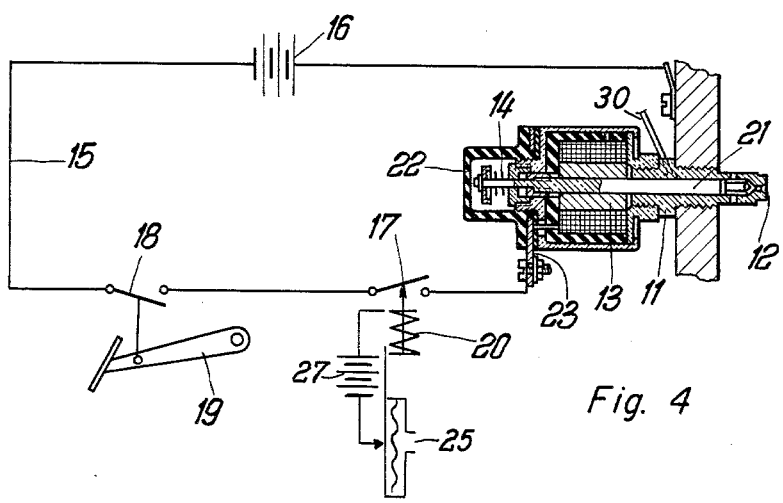
FIGURE 4 shows an idling control valve and a circuit for operating the valve.

Referring now more particularly to FIG. 4 of the drawing, the idling fuel nozzle 11 may be closed by means of a control valve 12 when the vehicle is moving without load. The control valve 12 is operated by means of an electromagnet 13 which is adapted to close valve 12 which is normally biased into the open position by means of a spring 14. If a fault occurs in the circuit of the electromagnetic device, spring 14 returns the control valve to the open position to assure a proper idling of the engine. The electromagnet 13 is connected into a circuit 15 in series with a battery 16. The circuit 15 includes also switch members 17 and 18. Switch member 18 is biased to the closed position by means of a spring (not shown) and may be actuated according to the embodiment shown in FIG. 4 by operating the clutch pedal 19 and clutch 26 which action opens the switch and interrupts the circuit. Control switch 17 is also biased to the closed position by means of a spring (not shown) and may be operated by an electromagnet 20 which is supplied with current in a known manner for example by a battery 27 having a vacuum switch 25 in its circuit so as to operate only when the engine rotates at a speed which corresponds to the idling of the engine. The electromagnet 20 then operates to move control switch 17 to the open position whereby the control valve circuit is opened and the needle valve is moved by spring 14 to the open position.

It is to be understood that instead of an electromagnetic generator to control the electromagnet 20 other equivalent means such as a membrane which is actuated by vacuum pressure, or a centrifugal switch, or an impulse control member operated by the ignition sparks may be employed. When the circuit to the electromagnet 13 is interrupted, spring member 14 lifts valve 12 away from the idling nozzle 11 so that fuel for operating the engine while idling may be fed through fuel line 30 into the suction tube formed by wall 28 of the carburetor of the two cycle internal combustion engine.

If the speed of revolution of the two cycle engine is increased, the electric current supplying the electromagnet 20 is interrupted and control switch 17 is biased by the associated spring member (not shown) into the closed position. This reestablishes the circuit 15 feeding electromagnet 13 and operates valve 12 against the biasing effect of spring 14 to close the fuel nozzle 11. The spring 14 is connected to the end of needle 21 outside the housing of the electromagnet 13. The non-magnetic needle 21, which may be made of brass or other suitable non-magnetic material, carries the valve 12 which may consist of steel. A protective cap 22 encloses spring 14 and serves simultaneously as a terminal for the electric cable 23, and seals the valve against outside air.

In operation, when clutch pedal 19 is depressed while the engine rotates at high speed, for instance in order to switch gears, the circuit 15 is interrupted by the opening of switch 18. The electromagnet 13 is rendered inoperative due to the opening of circuit 15 and valve 12 is retracted by means of spring 14 so that from the moment that the clutch pedal is depressed the fuel nozzle 11 in carburetor wall 28 is opened and a fuel-air mixture is supplied to the two cycle engine 7 or its crankcase pumps while the engine rotates at a relatively high speed. In this manner the charge in the compartments of the crankcase pumps which was previously not combustible is filled with a combustible mixture until an engine speed which corresponds to the idling condition of the engine is reached, so that the two cycle engine may operate without fault when it reaches the idling speed.

The carburetor normally supplies at higher altitudes a richer mixture because of the reduced air weight. This leads to a reduction of the engine power, and it is desirable therefore to provide an altitude correcting device of known construction in the carburetor of the two cycle engine. The altitude corrector regulates the main nozzle and provides that at any given altitude the proper ratio of air-fuel is supplied to the two cycle engine. It reduces the diameter of the nozzle as the pressure of the outside air 29 decreases and thereby decreases the supply of hydro carbons so that the after-burning in the catalyst is improved. The excess of air in the after-burner of catalyst 24 in exhaust chamber 10 is increased so that the formation of carbon monoxide, aldehydes and nitrogen oxides in the exhaust system are substantially reduced or eliminated.

The foregoing is considered as illustrative only of the principles of the invention. It is not desired to limit the invention to the exact construciton and operation shown and described since numerous modifications and changes will readily occur to those skilled in the art and accordingly all suitable modifications and equivalents may be applied which fall within the scope of the invention as claimed.

What is claimed is:

1. Arrangement for regulating the amount of unburnt hydrocarbons in exhaust gases of internal combustion engines comprising an engine, a fuel supply connected to said engine, valve means for regulating said fuel supply to said engine means for providing an air supply connected to said engine, means for combining said fuel supply with said air supply at a predetermined ratio, needle valve means for increasing the ratio of air to fuel supplied to said engine, a clutch, clutch operating means connected to said clutch and means for controlling the needle valve means including switch means operatively connected to and responsive to engine operation and responsive to said clutch operating means for controlling the amount of fuel supplied to said engine during operation without load.

2. Arrangement for improving the operation of internal combustion engines by regulating the amount of unburnt fuel in the exhaust gases comprising an engine, a fuel supply connected to said engine, means for regulating said fuel supply to said engine, including an idling fuel nozzle, means for providing an air supply connected to said engine, means for combining said fuel supply with said air supply valve means for reducing the amount of fuel supplied through said idling fuel nozzle, a clutch, clutch operating means connected to said clutch, switch means operatively connected to and responsive to engine operation and responsive to said clutch operating means for controlling the amount of fuel supplied to said engine during operation without load.

3. Arrangement for improving the operation of internal combustion engines comprising an engine, a fuel supply connected to said engine, valve means for regulating said fuel supply to said engine, including an idling fuel nozzle, means for providing an air supply connected to said engine, means for combining said fuel supply with said air supply a needle valve for controlling the fuel passing through said nozzle, spring means coacting with said needle valve adapted to bias said needle valve in the open position, an electromagnet means, a power supply, said electromagnet arranged in opposition to said spring and adapted to overcome the bias upon being connected to said power supply switch means located between said power supply and said electromagnet, said switch means being responsive to engine operation and responsive to said clutch operating means for controlling the amount of fuel supplied to said engine during operation without load.

4. An arrangement as defined in claim 3 wherein said needle valve needle portion is made of non-magnetic material and said valve portion is made of ferrous material.

5. An arrangement as defined in claim 3 wherein said spring means includes a protective cap, said cap providing a connection for said switch means.

6. An arrangement as defined in claim 2 further including electromagnetic means for actuating said valve.

(References on following page)

References Cited by the Examiner

UNITED STATES PATENTS

| | | | |
|---|---|---|---|
| 1,940,700 | 12/1933 | Riehm | 60—29 |
| 1,970,002 | 8/1934 | Ericsson | 123—124 |
| 1,990,702 | 2/1935 | Leibing. | |
| 2,022,094 | 11/1935 | Shoemaker et al. | 123—65 |
| 2,103,700 | 12/1937 | Smart | 192—.084 |
| 2,771,736 | 11/1956 | McKinley | 60—30 |
| 2,806,346 | 9/1957 | Clayton | 60—30 |
| 2,908,363 | 10/1959 | Dietrich et al. | 192—.084 |
| 2,946,325 | 7/1960 | Gentile. | |

DON A. WAITE, *Primary Examiner.*

JULIUS E. WEST, *Examiner.*